United States Patent
Noguchi et al.

(10) Patent No.: US 9,000,085 B2
(45) Date of Patent: Apr. 7, 2015

(54) CARBON FIBER COMPOSITE RESIN MATERIAL AND METHOD OF PRODUCING THE SAME

(75) Inventors: Toru Noguchi, Ueda (JP); Akira Magario, Ueda (JP); Morinobu Endo, Suzaka (JP)

(73) Assignee: Nissin Kogyo Co., Ltd., Nagano (JP)

( * ) Notice: Subject to any disclaimer, the term of this patent is extended or adjusted under 35 U.S.C. 154(b) by 58 days.

(21) Appl. No.: 11/785,881

(22) Filed: Apr. 20, 2007

(65) Prior Publication Data

US 2008/0167417 A1 Jul. 10, 2008

(51) Int. Cl.
*C08K 3/04* (2006.01)
*C08J 5/04* (2006.01)
*C08L 63/00* (2006.01)

(52) U.S. Cl.
CPC ............. *C08J 5/04* (2013.01); *C08J 2363/00* (2013.01); *C08L 63/00* (2013.01)

(58) Field of Classification Search
CPC ......... C08L 21/00; C08L 15/00; C08L 63/00; C08K 3/04; C08K 2201/011; C08K 7/24; C08K 7/00; C08K 5/3417; C08K 7/02; B82Y 30/00; B82Y 40/00; B29B 15/122; B29B 7/42; B29B 7/90
USPC ......... 524/439, 440, 441, 494, 495, 496, 503, 524/459; 252/500, 511; 428/407; 523/206, 523/209, 436; 429/34; 525/120, 122
See application file for complete search history.

(56) References Cited

U.S. PATENT DOCUMENTS

| | | | |
|---|---|---|---|
| 3,943,090 A | 3/1976 | Enever | |
| 5,433,906 A | 7/1995 | Dasch et al. | |
| 5,912,288 A * | 6/1999 | Nishimoto et al. | 524/114 |
| 6,045,898 A * | 4/2000 | Kishi et al. | 428/292.1 |
| 6,489,025 B2 | 12/2002 | Morita et al. | |
| 6,699,582 B2 | 3/2004 | Morita et al. | |
| 6,706,793 B2 | 3/2004 | Abu-Isa et al. | |
| 6,998,176 B2 | 2/2006 | Morita et al. | |
| 7,927,169 B2 | 4/2011 | Noguchi et al. | |
| 2001/0016254 A1 | 8/2001 | Mizuguchi et al. | |
| 2002/0015845 A1 | 2/2002 | Morita et al. | |
| 2003/0039828 A1 | 2/2003 | Morita et al. | |
| 2003/0157333 A1* | 8/2003 | Ren et al. | 428/408 |
| 2004/0131848 A1 | 7/2004 | Morita et al. | |
| 2004/0241440 A1* | 12/2004 | Noguchi et al. | 428/364 |
| 2005/0075433 A1 | 4/2005 | Mannion et al. | |
| 2005/0075443 A1 | 4/2005 | Noguchi et al. | |
| 2005/0171269 A1 | 8/2005 | Hu et al. | |
| 2005/0191490 A1 | 9/2005 | Ton-That et al. | |
| 2006/0062986 A1 | 3/2006 | Magario et al. | |
| 2006/0079627 A1 | 4/2006 | Noguchi et al. | |
| 2006/0083919 A1 | 4/2006 | Morita et al. | |
| 2006/0214560 A1 | 9/2006 | Noguchi et al. | |
| 2006/0286361 A1 | 12/2006 | Yonetake | |
| 2007/0100058 A1 | 5/2007 | Noguchi et al. | |
| 2007/0112124 A1 | 5/2007 | Noguchi et al. | |
| 2007/0167556 A1 | 7/2007 | Noguchi et al. | |
| 2008/0132635 A1 | 6/2008 | Noguchi et al. | |
| 2008/0167417 A1 | 7/2008 | Noguchi et al. | |
| 2008/0226537 A1 | 9/2008 | Morita et al. | |
| 2008/0261116 A1 | 10/2008 | Burton et al. | |
| 2009/0104386 A1 | 4/2009 | Barrera et al. | |
| 2010/0286309 A1 | 11/2010 | Noguchi et al. | |

FOREIGN PATENT DOCUMENTS

| | | |
|---|---|---|
| EP | 0 205 856 A2 | 12/1986 |
| EP | 1 191 131 A1 | 3/2002 |
| EP | 1 275 759 A1 | 1/2003 |
| EP | 1 466 940 A1 | 10/2004 |
| EP | 1 512 717 A1 | 3/2005 |
| EP | 1705211 | 9/2006 |
| EP | 1 792 935 A1 | 6/2007 |
| JP | A-04-185631 | 7/1992 |
| JP | A 5-84865 | 4/1993 |
| JP | A 2001-223494 | 8/2001 |
| JP | A-2003-12939 | 1/2003 |
| JP | A-2004-331929 | 11/2004 |
| JP | A-2004-338327 | 12/2004 |
| JP | A-2004-360160 | 12/2004 |
| JP | A-2005-015339 | 1/2005 |

(Continued)

OTHER PUBLICATIONS

Baek, Jong-Beom, Christopher B. Lyons, and Loon-Seng Tan. Covalent Modification of vapour-grown carbon nanofibers via direct Friedel-Crafts acylation in polyphosphoroic acid. May 19, 2004. Journal of Materials Chemistry. DOI: 10.1039/b401401d. Available online at: http://www.rsc.org/ej/JM/2004/B401401D/.*

Pyrograf III Product Website. (2001) Availble Online at: www.apsci.com/ppi-pyro3.html.*

Bussi et al . (Partially Miscible Blends of Epoxy Resin and Epoxidized Rubber: Structural Characterization of the Epoxidized Rubber and Mechanical Properties of the Blends, Journal of Applied Polymer Science, vol. 53, 441-454 (1994)).*

U.S. Appl. No. 11/475,032, filed Jun. 27, 2006 in the name of Noguchi et al.

(Continued)

*Primary Examiner* — Ling Choi
*Assistant Examiner* — Chun-Cheng Wang
(74) *Attorney, Agent, or Firm* — Oliff PLC

(57) ABSTRACT

A method of producing a carbon fiber composite resin material including (a) a first mixing step, (b) a second mixing step, and (c) a step of curing a second mixture. In the first mixing step (a), an epoxy resin is mixed with an epoxidized elastomer to obtain a first mixture. In the second mixing step (b), vapor-grown carbon fibers having an average diameter of 20 to 200 nm and an average length of 5 to 20 micrometers are mixed with the first mixture to obtain a second mixture in which the vapor-grown carbon fibers are dispersed. In the step (c) of curing the second mixture, the second mixture is cured to obtain a highly rigid carbon fiber composite resin material.

2 Claims, 8 Drawing Sheets

(56) References Cited

FOREIGN PATENT DOCUMENTS

| | | |
|---|---|---|
| JP | A-2005-068386 | 3/2005 |
| JP | A 2005-068386 | 3/2005 |
| JP | 2005097525 | 4/2005 |
| JP | A 2005-097525 | 4/2005 |
| JP | A-2006-089710 | 4/2006 |
| JP | A-2006-097006 | 4/2006 |
| JP | A 2006-198393 | 8/2006 |
| JP | A-2007-154150 | 6/2007 |
| KR | 10-2003-0036887 A | 5/2003 |
| KR | 2003-0036887 | 5/2003 |
| KR | A-10-2004-0087965 | 10/2004 |
| KR | 10-2005-0012181 A | 1/2005 |
| WO | WO 00/64668 A1 | 11/2000 |
| WO | WO 01/77423 A1 | 10/2001 |
| WO | WO 03/014441 A1 | 2/2003 |
| WO | WO 03/080513 A2 | 10/2003 |
| WO | WO 03080513 A2 * | 10/2003 |

OTHER PUBLICATIONS

U.S. Appl. No. 11/475,033, filed Jun. 27, 2006 in the name of Noguchi et al.
U.S. Appl. No. 11/594,933, filed Nov. 9, 2006 in the name of Noguchi et al.
U.S. Appl. No. 11/785,875, filed Apr. 20, 2007 in the name of Noguchi et al.
U.S. Appl. No. 11/475,032, in the name of Toru Noguchi et al, filed Jun. 27, 2006.
U.S. Appl. No. 11/475,033, in the name of Toru Noguchi et al, filed Jun. 27, 2006.
Hwang, D. G. et al., "Artificial Intelligence Heat Absorbing/Radiating Engineering Plastic," Database WPI Week 200414, Derwent Publications Ltd., XP-002430929 (2003).
Liu, Luqi et al., "Rubbery and Glassy Epoxy Resins Reinforced with Carbon Nanotubes," Composites Science and Technology, vol. 65, pp. 1861-1868 (Sep. 2005).
Epikote Resin 862 Product Bulletin, Resolution Performance Products, SC:1183-2, pp. 1-10, Sep. 2002.
Epikote Resin 828 Starting Formulation No. 8024, Resolution Performance Products, SC:1547-01, pp. 1-3, Nov. 2001.
Office Action dated Nov. 26, 2010 in U.S. Appl. No. 11/785,875.
Office Action dated Sep. 2, 2009 in U.S. Appl. No. 12/326,490.
U.S. Appl. No. 11/987,254, filed Nov. 28, 2007 in the name of Toru Noguchi et al.
U.S. Appl. No. 12/327,396, filed Dec. 3, 2008 in the name of Toru Noguchi et al.
U.S. Appl. No. 12/326,509, filed Dec. 2, 2008 in the name of Tow Noguchi et al.
U.S. Appl. No. 12/326,490, filed Dec. 2, 2008 in the name of Toru Noguchi et al.
U.S. Appl. No. 11/785,875, filed Apr. 20, 2007 in the name of Toru Noguchi et al.
Jun. 10, 2010 Office Action issued in U.S. Appl. No. 11/785,875.
Jan. 18, 2011 Office Action issued in U.S. Appl. No. 12/326,490.
Apr. 28, 2010 Office Action issued in U.S. Appl. No. 12/326,490.
Aug. 20, 2010 Notice of Allowance issued in U.S. Appl. No. 11/785,875.
Nov. 11, 2012 Communication issued in European Application No. 08 791 047.7.
Dec. 12, 2013 Office Action issued in Chinese Application No. 200880130280.0 (with English Translation).
Nov. 12, 2012 Communication issued in European Application No. 08 791 047.7.
Dec. 25, 2012 Office Action issued in Japanese Application No. 200880130280.0 (with English translation).
Feb. 10, 2014 Office Action issued in U.S. Appl. No. 12/326,490.
Oct. 27, 2011 Office Action issued in U.S. Appl. No. 11/785,875.
Apr. 26, 2012 Office Action issued in U.S. Appl. No. 11/785,875.
Office Action dated Mar. 20, 2013 issued in Korean Patent Application No. 10-2011-7003075 (with translation).
May 6, 2011 Office Action issued in U.S. Appl. No. 11/785,875.
Apr. 3, 2013 European Office Action issued in European Application No. 08 791 047.7.
Apr. 24, 2013 Notification of Decision of Rejection issued in Chinese Application No. 200880130280.0 (with English translation).
May 28, 2013 Notice of Pre-Appeal Reexamination Result issued in Korean Application No. 10-2011-7003075 (with English translation).
Gary G. Tibbetts et al., "A review of the fabrication and properties of vapor-grown carbon nanofiber/polymer composites," ScienceDirect, Composites Science and Technology, 67, 2007, pp. 1709-1718.
Jun. 27, 2012 Supplementary European Search Report issued in 08791047.7.
Jul. 5, 2012 European Examination Report issued in 08791047.7.
Aug. 30, 2012 Korean Office Action cited in Application No. 10-2011-7003075 (with English translation).
Jun. 22, 2011 Notification of Refusal issued in Japanese Application No. 2007-155078 with English-language translation.
U.S. Appl. No. 11/385,670 filed in the name of Toru Noguchi et al.
Jul. 27, 2011 Notification of Reasons for Refusal issued in Japanese Application No. 2008-161922 with English-language translation.
Jul. 25, 2013 Office Action issued in European Application No. 08 791 047.7.
Dec. 25, 2012 Office Action issued in Chinese Application No. 200880130280.0 (with English translation).

* cited by examiner

US 9,000,085 B2

CARBON FIBER COMPOSITE RESIN MATERIAL AND METHOD OF PRODUCING THE SAME

Japanese Patent Application No. 2006-125972, filed on Apr. 28, 2006, is hereby incorporated by reference in its entirety.

BACKGROUND OF THE INVENTION

The present invention relates to a carbon fiber composite resin material exhibiting high rigidity and a method of producing the same.

A composite material using carbon fibers, carbon black, graphite, carbon nanofibers, or the like has attracted attention. Such a composite material is expected to exhibit improved electric conductivity, heat transfer properties, mechanical strength, and the like, due to incorporation of the carbon material such as carbon fibers.

However, the carbon material generally exhibits low wettability (affinity) with a matrix material of the composite material, and exhibits low dispersibility in the matrix material. In particular, since the carbon nanofibers have strong aggregating properties, it is very difficult to uniformly disperse the carbon nanofibers in the matrix of the composite material.

The inventors of the invention have proposed a carbon fiber composite material in which carbon nanofibers are uniformly dispersed in an elastomer (see JP-A-2005-97525, for example).

A structural material used for automotive parts is generally required to exhibit high rigidity. Therefore, a metal such as iron or aluminum has been widely used for such a structural material.

SUMMARY

According to a first aspect of the invention, there is provided a method of producing a carbon fiber composite resin material comprising:

(a) a first mixing step of mixing an epoxy resin with an epoxidized elastomer to obtain a first mixture;

(b) a second mixing step of mixing vapor-grown carbon fibers having an average diameter of 20 to 200 nm and an average length of 5 to 20 micrometers with the first mixture to obtain a second mixture in which the vapor-grown carbon fibers are dispersed; and (c) a step of curing the second mixture.

According to a second aspect of the invention, there is provided a carbon fiber composite resin material comprising an epoxy resin matrix, an epoxidized elastomer, and vapor-grown carbon fibers, and having a dynamic modulus of elasticity (E') at 30° C. of 30 GPa or more.

DETAILED DESCRIPTION OF THE EMBODIMENT

Figure 1:
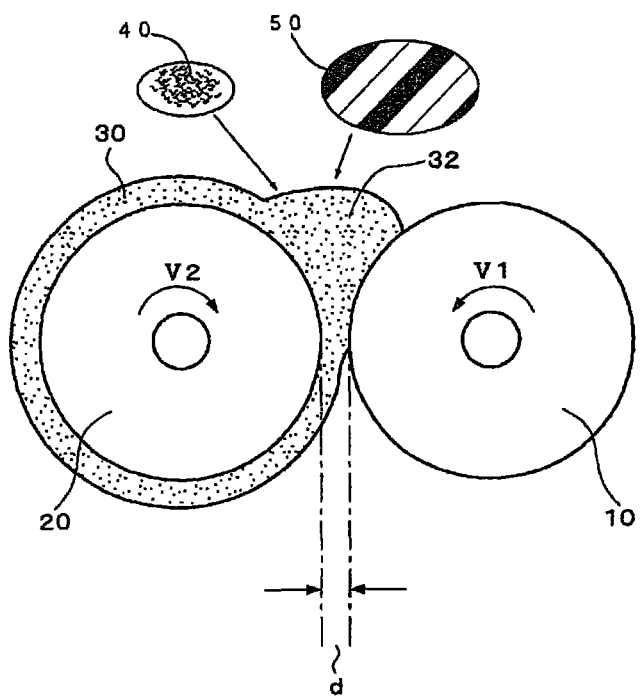
FIG. 1 is a view for schematically illustrating a mixing step using an open-roll method employed in one embodiment of the invention.

The invention may provide a carbon fiber composite resin material in which vapor-grown carbon fibers are uniformly dispersed in a matrix and which exhibits high rigidity, and a method of producing the same.

According to one embodiment of the invention, there is provided a method of producing a carbon fiber composite resin material comprising:

(a) a first mixing step of mixing an epoxy resin with an epoxidized elastomer to obtain a first mixture;

(b) a second mixing step of mixing vapor-grown carbon fibers having an average diameter of 20 to 200 nm and an average length of 5 to 20 micrometers with the first mixture to obtain a second mixture in which the vapor-grown carbon fibers are dispersed; and (c) a step of curing the second mixture.

The method of producing carbon fiber composite resin material according to this embodiment can produce a highly rigid resin material which may replace a metal structural material. Since the epoxy resin is used to produce the carbon fiber composite resin material, the carbon fiber composite resin material can be molded into a desired shape at a low temperature in a short time in comparison with a metal material, whereby cost and weight can be reduced. In order to disperse the nanometer-sized vapor-grown carbon fibers in the matrix, the matrix material must exhibit viscosity, elasticity, and polarity. The epoxy resin and the epoxidized elastomer exhibit viscosity, and the epoxidized elastomer exhibits elasticity. In terms of polarity, the epoxidized elastomer and the epoxy resin include an epoxy group. Therefore, the vapor-grown carbon fibers can be easily dispersed in the epoxy resin by mixing the vapor-grown carbon fibers with the first mixture including the epoxidized elastomer and the epoxy resin.

In this method of producing a carbon fiber composite resin material, the carbon fiber composite resin material may have the epoxidized elastomer content in a polymer component including the epoxidized elastomer, the epoxy resin, and a curing agent for the epoxy resin, of 10 to 40 wt %.

This configuration provides a highly rigid carbon fiber composite resin material in which the vapor-grown carbon fibers are uniformly dispersed. If the epoxidized elastomer content by weight in the carbon fiber composite resin material is less than 10 wt %, dispersion of the vapor-grown carbon fibers becomes insufficient. If the epoxidized elastomer content exceeds 40 wt %, the rigidity of the carbon fiber composite resin material is decreased.

In this method of producing a carbon fiber composite resin material, the vapor-grown carbon fibers may be rigid fibers having an average value of bending indices defined by the following expression (1) of 5 to 15, $$\text{Bending index} = L x \div D \qquad (1)$$

Lx: length of linear portion of the vapor-grown carbon fiber, and

D: diameter of the vapor-grown carbon fiber.

According to this configuration, a carbon fiber composite resin material exhibiting high rigidity can be produced by using the vapor-grown carbon fibers exhibiting particularly high rigidity in comparison with other carbon nanofibers.

According to one embodiment of the invention, there is provided a carbon fiber composite resin material comprising an epoxy resin matrix, an epoxidized elastomer, and vapor-grown carbon fibers, and having a dynamic modulus of elasticity (E') at 30° C. of 30 GPa or more.

According to the above carbon fiber composite resin material, a carbon fiber composite material exhibiting high rigidity almost equal to that of a metal structural material can be obtained by using the vapor-grown carbon fibers. Since the epoxy resin is used to produce the carbon fiber composite resin material, the carbon fiber composite resin material can be molded into a desired shape at a low temperature in a short time in comparison with a metal material, whereby cost and weight can be reduced. Moreover, since the carbon fiber composite resin material includes the epoxidized elastomer, the vapor-grown carbon fibers can be uniformly dispersed in the matrix.

In the above carbon fiber composite resin material, the dynamic modulus of elasticity (E') at 30° C. may be 40 GPa or more. According to this configuration, since the carbon fiber composite resin material exhibits high rigidity almost equal to that of a metal material although the epoxy resin is used as the matrix, a structural material can be obtained which has a reduced weight, exhibits excellent moldability, and does not rust.

In this carbon fiber composite resin material, the carbon fiber composite resin material may have an epoxidized elastomer content in a polymer component including the epoxidized elastomer, the epoxy resin, and a curing agent for the epoxy resin, of 10 to 40 wt %.

The above carbon fiber composite resin material may have an elongation at break of 4% or more. This ensures that the carbon fiber composite resin material can exhibit flexibility while exhibiting high rigidity almost equal to that of a metal material.

In this carbon fiber composite resin material, a network component of the epoxidized elastomer in an uncrosslinked form may have a spin-spin relaxation time (T2n), measured at 30° C. by a Hahn-echo method using a pulsed nuclear magnetic resonance (NMR) technique, of 100 to 3000 microseconds. An epoxidized elastomer having a spin-spin relaxation time (T2n) within this range exhibits a specific elasticity, whereby the vapor-grown carbon fibers can be uniformly dispersed in the composite elastomer.

In this carbon fiber composite resin material, the vapor-grown carbon fibers may be rigid fibers having an average value of bending indices defined by the following expression (1) of 5 to 15, $$\text{Bending index} = Lx \div D \qquad (1)$$

Lx: length of linear portion of the vapor-grown carbon fiber, and

D: diameter of the vapor-grown carbon fiber.

Some embodiments of the invention will be described in detail below, with reference to the drawings.

FIG. 1 is a view for schematically illustrating a mixing step using an open-roll method employed in one embodiment of the invention.

1. Epoxidized Elastomer

It is preferable that the elastomer used in this embodiment exhibit viscosity, elasticity, and polarity in order to disperse the vapor-grown carbon fibers in the elastomer. An epoxidized elastomer, which is an elastomer including an epoxy group, is preferable in terms of polarity. Since the epoxidized elastomer includes an epoxy group exhibiting excellent affinity to a terminal radical of the vapor-grown carbon fiber, the vapor-grown carbon fibers can be uniformly dispersed in the elastomer.

As the epoxidized elastomer, an elastomer including an epoxy group in the polymer, such as an epoxidized natural rubber, an epoxidized styrene thermoplastic elastomer (e.g. E-SBS), a terminal epoxy-modified styrene-butadiene rubber (E-SBR), or the like may be used. The epoxidation rate of the epoxidized elastomer is preferably 0.01 to 10%, and particularly preferably 0.5 to 3%. If the content of epoxy groups is 0.01% or more, the effect of improving the dispersibility of the vapor-grown carbon fibers is large. If the content of epoxy groups is 10% or less, the elastomer is prevented from hardening and exhibits good processability.

The elastomer has a molecular weight of preferably 5000 to 5,000,000, and still more preferably 20,000 to 3,000,000. If the molecular weight of the elastomer is within this range, the elastomer molecules are entangled and linked so that the elastomer exhibits excellent elasticity for dispersing the vapor-grown carbon fibers. Since the elastomer exhibits viscosity, the elastomer easily enters the space between the aggregated vapor-grown carbon fibers. Moreover, since the elastomer exhibits elasticity, the vapor-grown carbon fibers can be separated.

The network component of the elastomer in an uncrosslinked form has a spin-spin relaxation time (T2n/30° C.), measured at 30° C. by a Hahn-echo method using a pulsed nuclear magnetic resonance (NMR) technique, of preferably 100 to 3000 microseconds, and still more preferably 200 to 1000 microseconds. If the elastomer has a spin-spin relaxation time (T2n/30° C.) within the above range, the elastomer is flexible and has a sufficiently high molecular mobility. That is, the elastomer exhibits appropriate elasticity for dispersing the vapor-grown carbon fibers. Moreover, since the elastomer exhibits viscosity, the elastomer can easily enter the space between the vapor-grown carbon fibers due to a high degree of molecular motion when mixing the elastomer and the vapor-grown carbon fibers.

The network component of the elastomer in a crosslinked form preferably has a spin-spin relaxation time (T2n), measured at 30° C. by the Hahn-echo method using the pulsed NMR technique, of 100 to 2000 microseconds. The reasons therefor are the same as those described for the uncrosslinked form. Specifically, when crosslinking an uncrosslinked form which satisfies the above conditions using the production method according to the invention, the spin-spin relaxation time (T2n) of the resulting crosslinked form almost falls within the above range.

The spin-spin relaxation time obtained by the Hahn-echo method using the pulsed NMR technique is a measure indicating the molecular mobility of a substance. In more detail, when measuring the spin-spin relaxation time of the elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method for the pulsed NMR technique, a solid-echo method, a Carr-Purcell-Meiboom-Gill (CPMG) method, or a 90-degree pulse method may be applied instead of the Hahn-echo method. However, since the carbon fiber composite resin material according to this embodiment has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

The vapor-grown carbon fiber generally has a structure in which the side surface is formed of a six-membered ring of carbon atoms and the end is closed by a five-membered ring. Since the vapor-grown carbon fiber has a forced structure, defects tend to occur, whereby a radical or a functional group tends to be produced at the defects. According to this embodiment, since at least one of the main chain, side chain, and terminal chain of the elastomer includes an epoxy group exhibiting high affinity (polarity) to the radical of the vapor-grown carbon fiber, the elastomer and the vapor-grown carbon fiber can be bonded. This allows the vapor-grown carbon fibers to be easily dispersed against the aggregating force of the vapor-grown carbon fibers. When mixing the elastomer and the vapor-grown carbon fibers, free radicals produced due to breakage of the elastomer molecular chain attack the defects of the vapor-grown carbon fibers to produce radicals on the surfaces of the vapor-grown carbon fibers.

The epoxidized elastomer content in the polymer component including the epoxidized elastomer, the epoxy resin, and a curing agent for the epoxy resin in the carbon fiber composite resin material is preferably adjusted to 10 to 40 wt %. This configuration provides a highly rigid carbon fiber composite resin material in which the vapor-grown carbon fibers are uniformly dispersed. If the epoxidized elastomer content in the polymer component is less than 10 wt %, dispersion of the vapor-grown carbon fibers becomes insufficient. If the epoxidized elastomer content exceeds 40 wt %, the rigidity of the carbon fiber composite resin material is decreased.

2. Epoxy Resin

The epoxy resin is not particularly limited insofar as the epoxy resin is generally industrially used. As examples of a typical epoxy resin, epoxy resins having two or more epoxy groups in the molecule can be given, such as a bisphenol A type epoxy resin produced from bisphenol A, a bisphenol F type epoxy resin produced from bisphenol F, and a bisphenol S type epoxy resin produced from bisphenol S. A curing agent for the epoxy resin may be appropriately selected from industrially used curing agents depending on the application. As examples of the curing agent, an amine curing agent, an acid anhydride curing agent, and the like can be given.

The epoxy resin is liquid at a temperature employed in the first mixing step (a) and the second mixing step (b), and exhibits viscosity but does not exhibit elasticity, differing from the elastomer. Therefore, even if the vapor-grown carbon fibers are mixed into the epoxy resin, the vapor-grown carbon fibers cannot be dispersed. Since the epoxy resin includes an epoxy group exhibiting affinity to the vapor-grown carbon fiber together with the epoxidized elastomer, the vapor-grown carbon fibers can be easily dispersed in the matrix in the second mixing step (b). Moreover, since the epoxy resin exhibits excellent mutual solubility with the epoxidized elastomer, the entire matrix becomes uniform in the first mixing step (a) and the second mixing step (b), whereby the vapor-grown carbon fibers can be dispersed due to the elasticity of the epoxidized elastomer.

3. Vapor-Grown Carbon Fiber

The vapor-grown carbon fibers used in this embodiment are rigid fibers having an average diameter of 20 to 200 nm, preferably 60 to 180 nm, and still more preferably 80 to 160 nm, an average length of 5 to 20 micrometers, and an average bending index of 5 to 15. The vapor-grown carbon fiber content of the carbon fiber composite resin material is preferably 10 to 45 wt %. If the vapor-grown carbon fiber content is less than 10 wt %, the rigidity of the carbon fiber composite resin material is not sufficiently increased. If the vapor-grown carbon fiber content exceeds 45 wt %, processing becomes difficult due to too high a rigidity.

The bending index indicates the rigidity of the vapor-grown carbon fibers, and is obtained by measuring the lengths of linear portions and the diameters of a number of vapor-grown carbon fibers photographed using a microscope or the like, and calculating the bending index from the measured values. A bent portion (defect) of a carbon nanofiber including the vapor-grown carbon fiber photographed using an electron microscope appears as a white line which crosses the fiber in the width direction. When the length of the linear portion of the vapor-grown carbon fiber is Lx and the diameter of the vapor-grown carbon fiber is D, the bending index is defined by Lx÷D. Therefore, a vapor-grown carbon fiber having a low bending index is bent at a short interval, and a vapor-grown carbon fiber having a high bending index has a long linear portion and is not bent.

The length Lx of the linear portion of the vapor-grown carbon fiber according to this embodiment is measured in a state in which photograph data of the vapor-grown carbon fibers photographed at a magnification of 10,000 to 50,000 is enlarged by a factor of 2 to 10, for example. A bent portion (defect) which crosses the fiber in the width direction can be observed in the enlarged photograph. The distance between the adjacent bent portions (defects) thus observed is measured at multiple points as the length Lx of the linear portion of the vapor-grown carbon fiber.

As examples of nanometer-sized carbon fibers (carbon nanofibers), single-wall carbon nanotubes, multi-wall carbon nanotubes, vapor-grown carbon fibers, and the like can be given. The vapor-grown carbon fiber has a defect in the bent portion and is generally bent in the bent portion. It is estimated that the vapor-grown carbon fiber exhibits low rigidity in the bent portion (defect). When load (strain) is applied to the vapor-grown carbon fiber, the vapor-grown carbon fiber tends to be bent and deformed in the bent portion (defect), whereby the rigidity of the vapor-grown carbon fiber is decreased. The length Lx of the linear portion of the vapor-grown carbon fiber refers to the length of the vapor-grown carbon fiber in which such a defect does not occur. Therefore, it is estimated that the vapor-grown carbon fiber exhibits low rigidity when the vapor-grown carbon fiber has a low bending index. On the other hand, it is estimated that the vapor-grown carbon fiber exhibits high rigidity when the vapor-grown carbon fiber has a high bending index.

Such a rigid vapor-grown carbon fiber may be produced by a vapor-phase growth method. In the vapor-phase growth method, vapor-grown carbon fibers are synthesized by thermally decomposing hydrocarbons such as benzene or toluene in a vapor phase. As specific examples of the vapor-phase growth method, a floating catalyst method, a zeolite-supported catalyst method, and the like can be given. Vapor-grown carbon fibers obtained by the vapor-phase growth method using a metal catalyst are commercially available as VGCF (Vapor-Grown Carbon Fiber; registered trademark) manufactured by Showa Denko K. K., for example.

The vapor-grown carbon fibers may be provided with improved adhesion to and wettability with the elastomer by subjecting the vapor-grown carbon fibers to surface treatment, such as ion-injection treatment, sputter-etching treatment, or plasma treatment, before mixing the vapor-grown carbon fibers with the elastomer.

4. Method of Producing Carbon Fiber Composite Resin Material

A method of producing a carbon fiber composite resin material according to this embodiment may include (a) a first mixing step of mixing an epoxy resin with an epoxidized elastomer to obtain a first mixture, (b) a second mixing step of mixing vapor-grown carbon fibers having an average diameter of 20 to 200 nm and an average length of 5 to 20 micrometers with the first mixture to obtain a second mixture in which the vapor-grown carbon fibers are dispersed, and (c) a step of curing the second mixture.

4.1. First Mixing Step (A)

In the first mixing step (a), the liquid epoxy resin is mixed with the epoxidized elastomer. A mixer (processing machine) is selected depending on the viscosity. It is preferable to use an internal mixer such as a Henschel mixer when using the liquid epoxy resin as employed in this embodiment. Note that an open roll mixer using three rolls or two rolls may also be used. FIG. 1 is a view schematically showing an open-roll method using two rolls. In FIG. 1, a reference numeral 10 indicates a first roll, and a reference numeral 20 indicates a second roll. The first roll 10 and the second roll 20 are disposed at a specific distance d of preferably 0.5 to 5 mm (e.g. 1.0 mm). In FIG. 1, the first roll 10 and the second roll 20 are rotated in the directions indicated by the arrows. An epoxidized elastomer 30 is wound around the second roll 20. After the addition of an epoxy resin 50 to a bank 32, the first and second rolls 10 and 20 are rotated to mix the epoxidized elastomer 30 and the epoxy resin 50. When carrying out the first mixing step (a) at a low temperature, a curing agent may be added in the first mixing step (a). The rotational speed of the first roll 10 is 22 rpm, and the rotational speed of the second roll 20 is 20 rpm, for example. This causes the epoxidized elastomer 30 and the epoxy resin to be mixed to obtain a sheet-shaped first mixture.

4.2. Second Mixing Step (B)

In the second mixing step, vapor-grown carbon fibers are added to and mixed with the first mixture to obtain a second mixture in which the vapor-grown carbon fibers are dispersed. The second mixing step (b) may be carried out using a mixer for an open-roll method, an internal mixing method, a multi-screw extrusion kneading method, or the like in the same manner as the first mixing step (a). In this embodiment, the second mixing step (b) is carried out after the first mixing step (a) using the open roll mixer shown in FIG. 1. After the addition of vapor-grown carbon fibers 40 to the bank 32 of the first mixture, the first and second rolls 10 and 20 are rotated to mix the elastomer 30 and the vapor-grown carbon fibers 40. The mixture is tight-milled a number of times. The rotational speed of the first roll 10 is 22 rpm, and the rotational speed of the second roll 20 is 20 rpm, for example. After reducing the distance d between the first and second rolls 10 and 20 to preferably 0.1 mm to 0.5 mm (e.g. 0.1 mm), the first and second rolls 10 and 20 are rotated at the above rotational speeds (e.g. roll surface rotational speed ratio is 1.1). This causes a high shear force to be applied to the first mixture, whereby the aggregated vapor-grown carbon fibers are separated by the shear force so that the vapor-grown carbon fibers are removed one by one and become dispersed in the first mixture. After increasing the roll surface rotational speed ratio to 1.3 (e.g. first roll: 26 rpm/second roll: 20 rpm), the mixture is rolled at a roll distance d (e.g. 0.5 mm) to obtain a sheet-shaped second mixture.

In this case, since the epoxidized elastomer exhibits the above-mentioned viscosity, elasticity, and polarity (epoxy group) and the epoxy resin exhibits viscosity and polarity to facilitate dispersion of the vapor-grown carbon fibers, a second mixture can be obtained in which the vapor-grown carbon fibers exhibit excellent dispersibility and dispersion stability (i.e. dispersed vapor-grown carbon fibers rarely reaggregate). In more detail, when mixing the first mixture and the vapor-grown carbon fibers, the epoxidized elastomer exhibiting viscosity enters the space between the vapor-grown carbon fibers, and the epoxy group bonds to a highly active site of the vapor-grown carbon fibers through chemical interaction. When a high shear force is applied to the first mixture and the vapor-grown carbon fibers in this state, the vapor-grown carbon fibers move along with deformation of the epoxidized elastomer included in the first mixture. The aggregated vapor-grown carbon fibers are separated by the restoring force of the shorn epoxidized elastomer due to elasticity, and are dispersed in the first mixture. According to this embodiment, when the mixture is extruded through the narrow space between the rolls, the second mixture is deformed to have a thickness greater than the roll distance as a result of the restoring force of the elastomer included in the first mixture due to elasticity. It is estimated that the above deformation causes the second mixture to which a high shear force is applied to flow in a more complicated manner to disperse the vapor-grown carbon fibers in the elastomer. The dispersed vapor-grown carbon fibers are prevented from reaggregating due to chemical interaction with the epoxidized elastomer, whereby the vapor-grown carbon fibers exhibit excellent dispersion stability.

In the second mixing step (b), the first mixture and the vapor-grown carbon fibers are mixed at a relatively low temperature of preferably 0 to 50° C., and still more preferably 5 to 30° C. in order to obtain as high a shear force as possible. When using the open-roll method, it is preferable to set the roll temperature at the above temperature.

The curing agent for the epoxy resin may be added in the first mixing step (a), in the second mixing step (b), or after the second mixing step (b) insofar as the curing agent is added before the step (c) of curing the second mixture.

4.3. Step (C) of Curing Second Mixture

In the step (c) of curing the second mixture, a general molding method for a thermosetting resin may be employed. For example, the second mixture including a curing agent may be placed in a mold heated at a specific temperature and compression-molded at a specific pressure. Or, the second mixture may be molded using a transfer molding machine or the like. The molding temperature and the molding time may be appropriately set depending on the types of epoxy resin and curing agent selected. In the second mixture pressurized in a heated mold for a specific period of time, the epoxy resin is crosslinked and cured due to the curing agent. The second mixture is then removed from the mold to obtain a carbon fiber composite resin material.

5. Carbon Fiber Composite Resin Material

In the carbon fiber composite resin material according to this embodiment, the vapor-grown carbon fibers are uniformly dispersed in the epoxy resin as the matrix. The carbon fiber composite resin material includes the epoxidized elastomer and the vapor-grown carbon fibers in the epoxy resin matrix, and has a dynamic modulus of elasticity (E') at 30° C.

of preferably 30 GPa or more, and still more preferably 40 GPa or more. The carbon fiber composite resin material preferably has an elongation at break of 4% or more.

Examples 1 to 7 according to the invention and Comparative Examples 1 to 8 are described below. Note that the invention is not limited to the following examples.

(1) Preparation of Sample

First Mixing Step (A)

An epoxidized elastomer was supplied to a 6-inch open roll (roll temperature: 10 to 50° C.) and wound around the roll. An epoxy resin (base resin) was supplied to and mixed with the epoxidized elastomer to obtain a first mixture. The roll distance was set at 1 mm, and the roll rotational speed was set at 22 rpm/20 rpm. The types and amounts (phr) of the epoxidized elastomer and the epoxy resin are shown in Tables 1 and 2.

Second Mixing Step (B)

A filler was supplied to and mixed with the first mixture. After reducing the roll distance to 0.1 mm, the mixture was tight-milled five times to obtain a second mixture. The roll rotational speed was set at 22 rpm/20 rpm. The type and amount (phr) of the filler are shown in Tables 1 and 2.

Third Mixing Step

After setting the roll distance at 1 mm and the roll rotational speed at 22 rpm/20 rpm, the second mixture was supplied to the open roll. After the addition of a curing agent, the components were mixed. The type and amount (phr) of the curing agent are shown in Tables 1 and 2. The roll temperature was set at 50° C. or less.

Step (C) of Curing Second Mixture

The second mixture including the curing agent was removed from the open roll and placed in a mold with a thickness of 2 mm. The second mixture was press-molded at 150° C. for five minutes at a pressure of 10 MPa to obtain a cured (crosslinked) carbon fiber composite resin material sample. In Comparative Example 6, since the amount of vapor-grown carbon fibers B was too great, it was difficult process the mixture in the second mixing step (b), whereby the step (c) could not be carried out.

In Tables 1 and 2, "Epikote 828" used as the base resin of the epoxy resin is a bisphenol A type epoxy resin manufactured by Japan Epoxy Resins Co., Ltd., and "Epikote 807" is a bisphenol F type epoxy resin manufactured by Japan Epoxy Resins Co., Ltd. "Epikote 828" has a viscosity of 120 to 150 Poise/25° C. and an epoxy equivalent of 172 to 178, and "Epikote 807" has a viscosity of 30 to 45 Poise/25° C. and an epoxy equivalent of 160 to 170. In Tables 1 and 2, "Amicure VDH" used as the curing agent for the epoxy resin is a hydrazide curing agent manufactured by Ajinomoto Fine-Techno Co., Inc. (white powder, melting point: 120° C.). In Tables 1 and 2, "E-SBS" used as the epoxidized elastomer is an epoxidized styrene-butadiene block copolymer manufactured by Daicel Chemical Industries, Ltd. (Epofriend A 1005, molecular weight: 100,000, epoxidation rate: 1.7%), "E-NR" is epoxidized natural rubber (molecular weight: about 3,000,000, epoxidation rate: 30%), and "SBS" is a styrene-butadiene block copolymer (SBS) which does not include an epoxy group (manufactured by Shell). In Tables 1 and 2, "vapor-grown carbon fiber A" indicates vapor-grown carbon fibers having an average diameter of 87 nm and an average length of 10 micrometers, "vapor-grown carbon fiber A" indicates vapor-grown carbon fibers "VGCF" (registered trademark, manufactured by Showa Denko K. K.) having an average diameter of 150 nm (measured value: 156 nm) and an average length of 10 micrometers, "CNT13" indicates multi-wall carbon nanotubes (CVD) (manufactured by ILJIN Nanotech Co., Ltd.) having an average diameter of 13 nm, and "HAF" indicates HAF-HS carbon black.

In Tables 1 and 2, the term "elastomer content (wt %)" refers to the epoxidized elastomer content in the polymer component (base resin+curing agent+epoxidized elastomer), and the term "filler content (wt %)" refers to the filler content in the carbon fiber composite resin material (epoxy resin+epoxidized elastomer+filler).

(2) Measurement of Average Bending Index of Vapor-Grown Carbon Fibers

Figure 2:
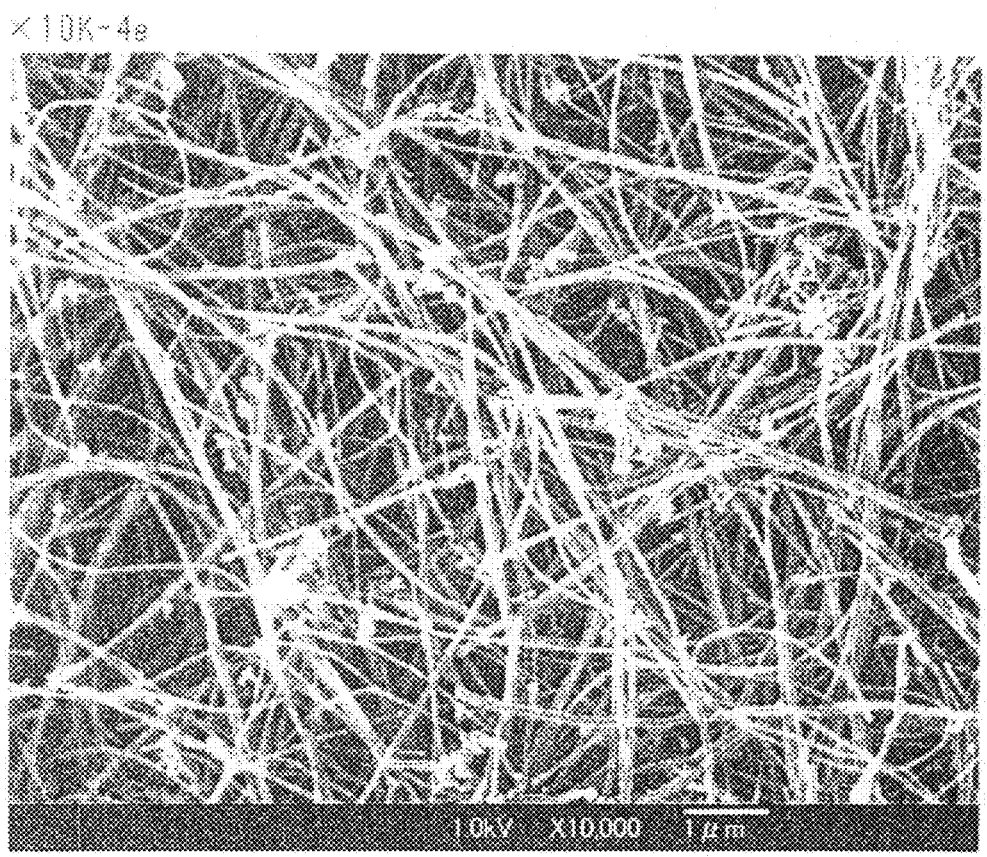
FIG. 2 shows an electron micrograph (magnification: 10,000) of vapor-grown carbon fibers A.
Figure 3:
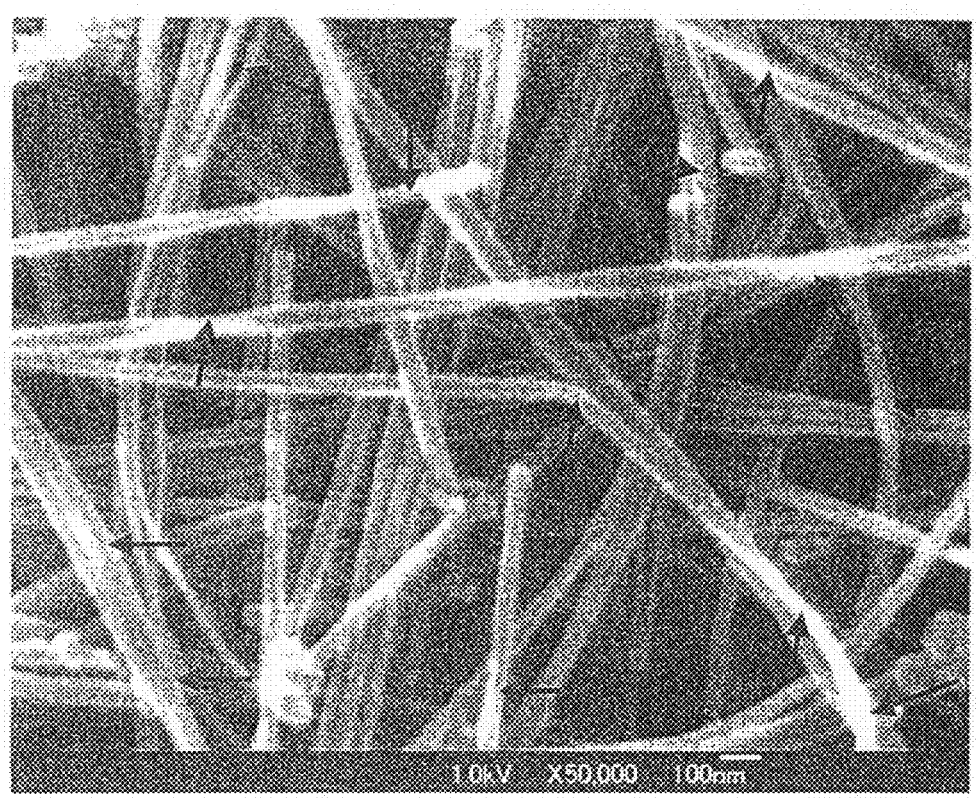
FIG. 3 shows an electron micrograph (magnification: 50,000) of the vapor-grown carbon fibers A.
Figure 4:
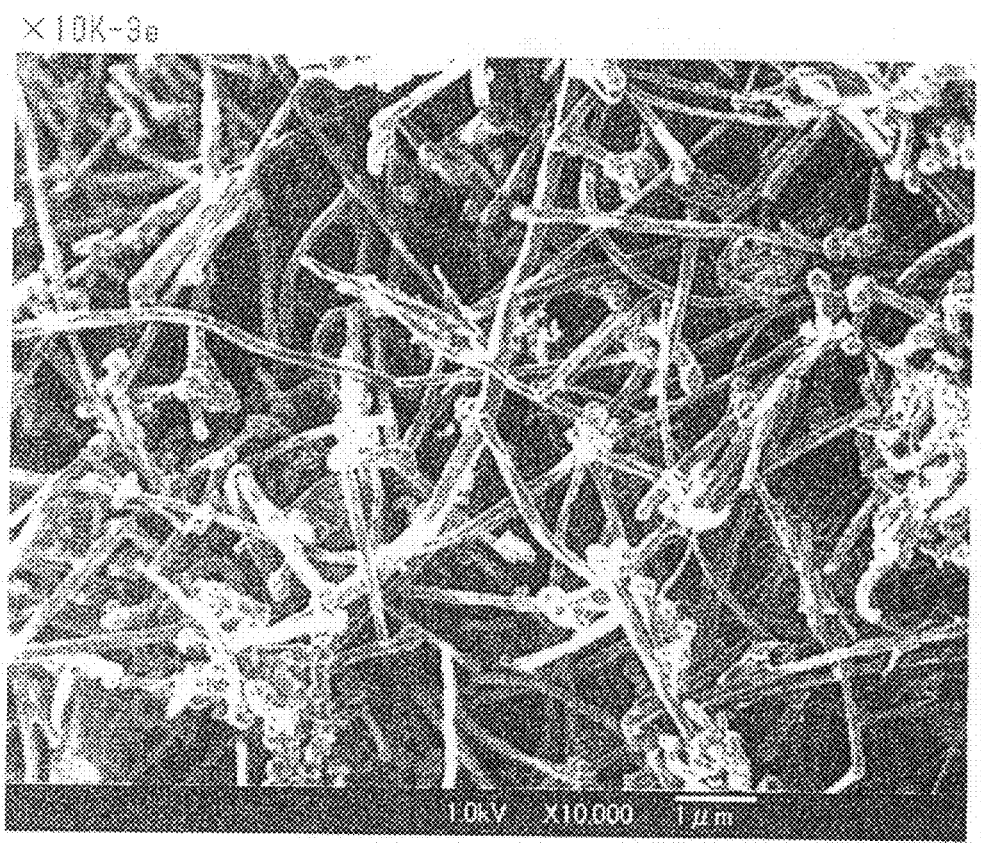
FIG. 4 shows an electron micrograph (magnification: 10,000) of vapor-grown carbon fibers B.
Figure 5:
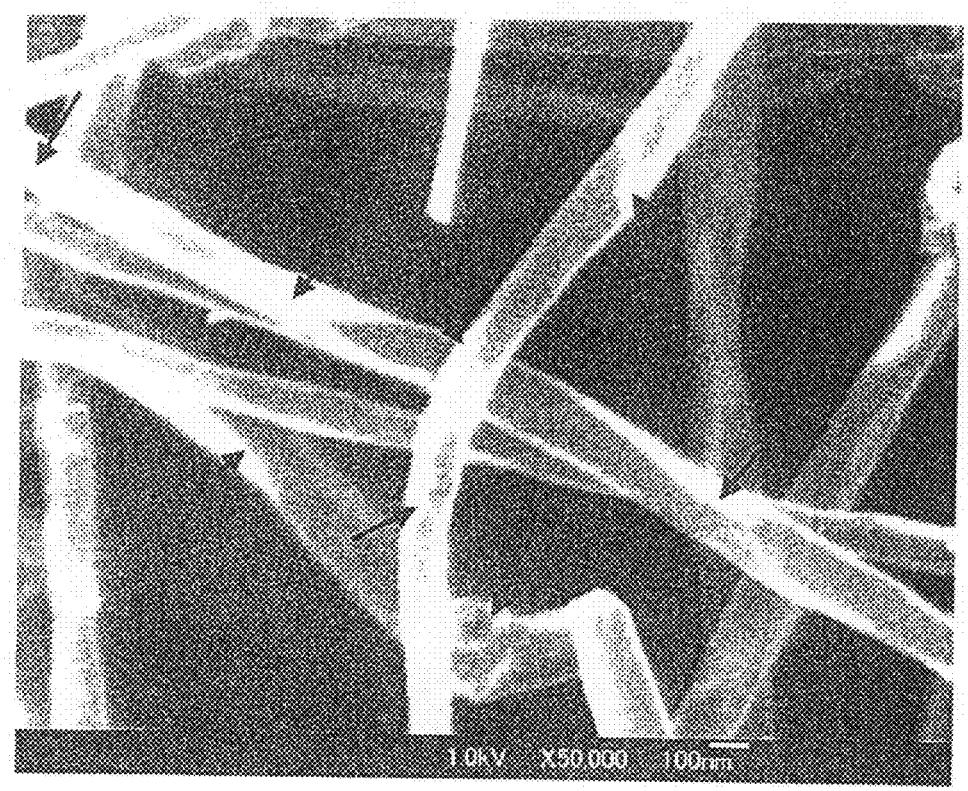
FIG. 5 shows an electron micrograph (magnification: 50,000) of the vapor-grown carbon fibers B.
Figure 6:
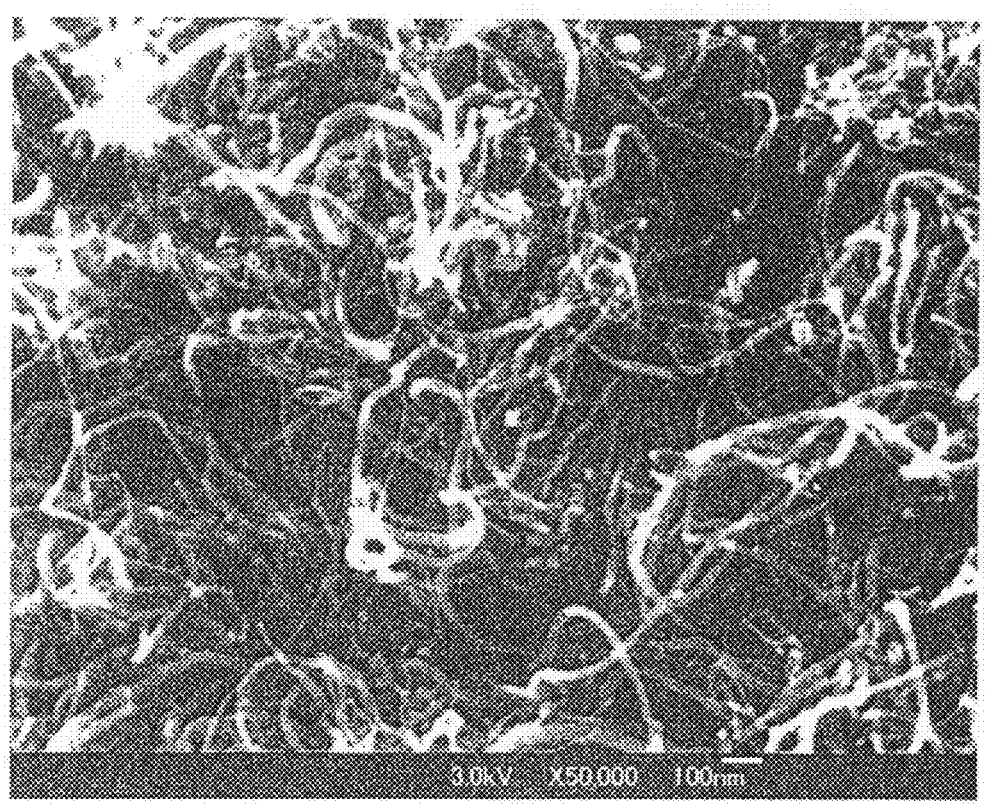
FIG. 6 shows an electron micrograph (magnification: 50,000) of CNT13.
Figure 7:
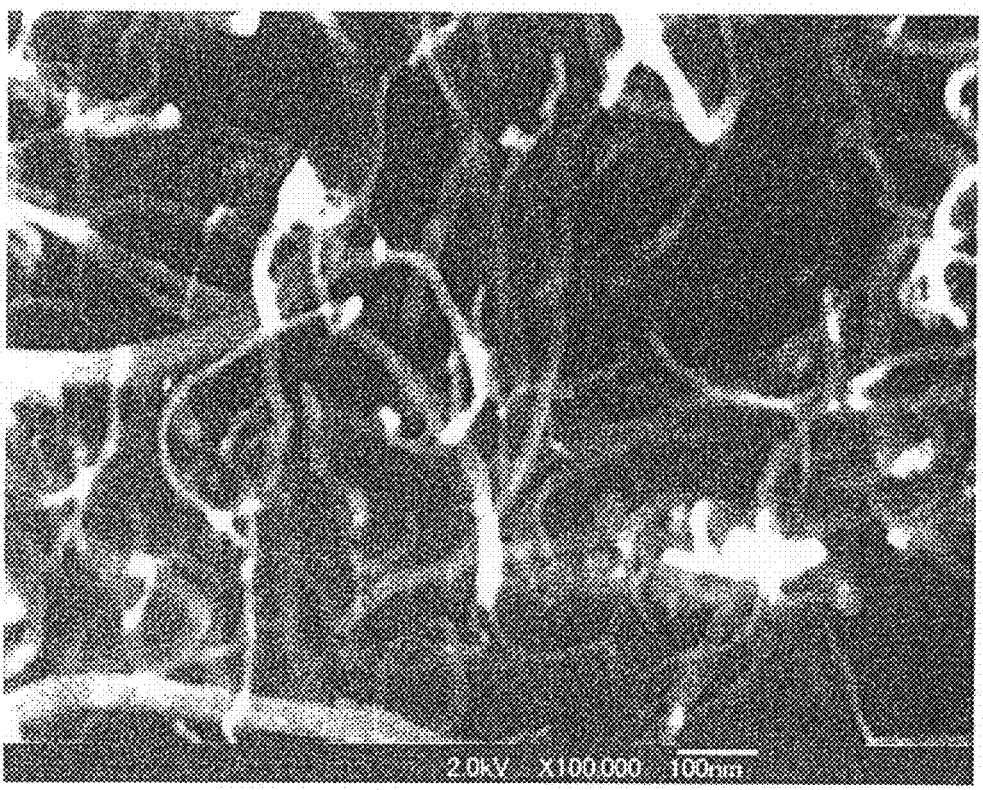
FIG. 7 shows an electron micrograph (magnification: 100,000) of the CNT13.
Figure 8:
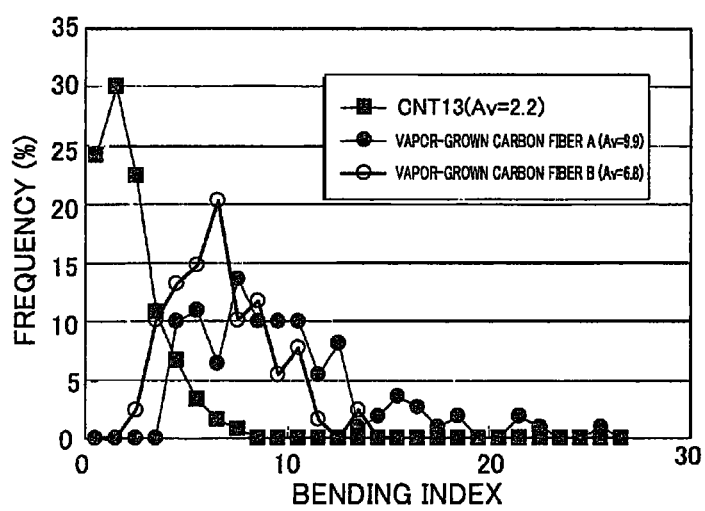
FIG. 8 shows a line graph indicating the distribution of the degree of bending in which the horizontal axis indicates the bending index and the vertical axis indicates the frequency (%).

The vapor-grown carbon fibers used in Examples 1 to 7 and Comparative Examples 1, 2, and 5 to 7 were photographed using an electron microscope (SEM) at 1.0 kV and a magnification of 10,000. The photograph was enlarged by a factor of 5 and printed, and the length Lx of the linear portion (distance between adjacent defects) of the fiber and the diameter D of the fiber were measured. FIG. 2 shows the electron micrograph of the vapor-grown carbon fibers A photographed at 1.0 kV and a magnification of 10,000, in which a number of carbon nanofibers which are bent to only a small extent are observed. In FIG. 3 showing the electron micrograph of the vapor-grown carbon fibers A observed at a magnification of 50,000, defects such as twists and bends are observed at locations indicated by the arrows. FIG. 4 shows the electron micrograph of the vapor-grown carbon fibers B photographed at a magnification of 10,000, and FIG. 5 shows the electron micrograph of the vapor-grown carbon fibers B observed at a magnification of 50,000. In FIG. 5, defects are observed at locations indicated by the arrows in the same manner as in FIG. 3. FIG. 6 shows the electron micrograph of the CNT13 photographed at a magnification of 50,000, and FIG. 7 shows the electron micrograph of the CNT13 observed at a magnification of 100,000. The CNT13 showed defects at a short interval in comparison with the vapor-grown carbon fibers A and B, and was bent to a large extent. In the measurement of the length Lx, the distance between the defects was measured. The bending indices of each fiber were calculated by Lx/D at 200 locations using the measurement results, and divided by the number of measurement locations (200) to determine the average bending index. The average bending index of the vapor-grown carbon fibers A was 9.9, the average bending index of the vapor-grown carbon fibers B was 6.8, and the average bending index of the CNT13 was 2.2. The average diameter of the vapor-grown carbon fibers A was 87 nm, the average diameter of the vapor-grown carbon fibers B was 156 nm, and the average diameter of the CNT13 was 13 nm. FIG. 8 shows a graph of the distribution of the degree of bending of each fiber in which the horizontal axis indicates the bending index and the vertical axis indicates the frequency (%).

(3) Measurement of Tensile Strength (MPa)

A specimen prepared by cutting each sample in the shape of a IA dumbbell was subjected to a tensile test in accordance with JIS K7161 at a temperature of 23±2° C. and a tensile rate of 500 mm/min using a tensile tester manufactured by Toyo Seiki Seisaku-sho, Ltd. to measure the tensile strength (MPa). The results are shown in Tables 1 and 2.

(4) Measurement of Elongation at Break (%)

A specimen prepared by cutting each sample in the shape of a dumbbell in accordance with JIS-K6251-1993 was subjected to a tensile fracture test at a temperature of 23±2° C. and a tensile rate of 500 mm/min using a tensile tester manufactured by Toyo Seiki Seisaku-sho, Ltd. to measure the elongation at break (%). The results are shown in Tables 1 and 2.

(5) Measurement of Dynamic Modulus of Elasticity (GPa)

A specimen prepared by cutting each sample in the shape of a strip (40×1×5 (width) mm) was subjected to a dynamic viscoelasticity test using a dynamic viscoelasticity tester DMS6100 manufactured by SII at a chuck distance of 20 mm, a temperature of 30° C., a dynamic strain of ±0.05%, and a frequency of 10 Hz to measure the dynamic modulus of elasticity (E') at 30° C. The results are shown in Tables 1 and 2.

(6) Measurement Using Pulsed NMR Technique

Each epoxidized elastomer was subjected to measurement by the Hahn-echo method using the pulsed NMR technique. The measurement was conducted using a "JMN-MU25" manufactured by JEOL, Ltd. The measurement was conducted under conditions of an observing nucleus of $^1H$, a resonance frequency of 25 MHz, and a 90-degree pulse width of 2 microseconds. A decay curve was determined while changing Pi in the pulse sequence (90° x-Pi-180° x) of the Hahn-echo method. The sample was measured in a state in which the sample was inserted into a sample tube within an appropriate magnetic field range. The measurement temperature was 30° C. The first component of the spin-spin relaxation time (T2n) of the epoxidized elastomer was determined by this measurement. The spin-spin relaxation time (T2n) of "E-NR" was 600 microseconds, and the spin-spin relaxation time (T2n) of "E-SBS" was 860 microseconds.

TABLE 1

|  |  |  | Example 1 | Example 2 | Example 3 | Example 4 | Example 5 | Example 6 | Example 7 |
|---|---|---|---|---|---|---|---|---|---|
| Epoxy resin | Base resin | Epikote 828 (phr) | 100 | 100 | 100 | 100 | 100 | 0 | 100 |
|  |  | Epikote 807 (phr) | 0 | 0 | 0 | 0 | 0 | 100 | 0 |
|  | Curing agent | Amicure VDH (phr) | 40 | 40 | 40 | 40 | 40 | 40 | 40 |
| Epoxydized elastomer |  | E-SBS (phr) | 20 | 50 | 50 | 80 | 50 | 50 | 0 |
|  |  | E-NR (phr) | 0 | 0 | 0 | 0 | 0 | 0 | 50 |
| T2n of elastomer (30° C.) (microsecond) |  |  | 860 | 860 | 860 | 860 | 860 | 860 | 600 |
| Elastomer content (wt %) |  |  | 12.5 | 26.3 | 26.3 | 36.4 | 26.3 | 26.3 | 26.3 |
| Filler | CNT | Vapor-grown carbon fiber B (phr) | 50 | 50 | 150 | 50 | 0 | 50 | 50 |
|  |  | Vapor-grown carbon fiber A (phr) | 0 | 0 | 0 | 0 | 50 | 0 | 0 |
| Average bending index of filler |  |  | 6.8 | 6.8 | 6.8 | 6.8 | 9.9 | 6.8 | 6.8 |
| Filler content (wt %) |  |  | 22.5 | 18.8 | 40.9 | 16.3 | 18.8 | 18.8 | 18.8 |
| Properties of carbon fiber composite resin material | Tensile strength (MPa) |  | 49 | 42 | 48 | 42 | 42 | 39 | 46 |
|  | Elongation at break (%) |  | 7 | 8 | 5 | 11 | 8 | 9 | 10 |
|  | Modulus of elasticity E' (30° C.) (GPa) |  | 65 | 45 | 110 | 37 | 75 | 51 | 53 |

TABLE 2

|  |  |  | Comparative Example 1 | Comparative Example 2 | Comparative Example 3 | Comparative Example 4 | Comparative Example 5 |
|---|---|---|---|---|---|---|---|
| Epoxy resin | Base resin | Epikote 828 (phr) | 100 | 100 | 100 | 100 | 100 |
|  |  | Epikote 807 (phr) | 0 | 0 | 0 | 0 | 0 |
|  | Curing agent | Amicure VDH (phr) | 40 | 40 | 40 | 40 | 40 |
| Epoxydized elastomer |  | E-SBS (phr) | 10 | 5 | 0 | 50 | 50 |
|  |  | E-NR (phr) | 0 | 0 | 0 | 0 | 0 |
|  |  | SBS (phr) | 0 | 0 | 0 | 0 | 0 |
| T2n of elastomer (30° C.) (microsecond) |  |  | 860 | 860 | — | 860 | 860 |
| Elastomer content (wt %) |  |  | 6.7 | 3.4 | 0 | 26.3 | 26.3 |
| Filler | CNT | Vapor-grown carbon fiber B (phr) | 20 | 10 | 0 | 0 | 10 |
|  |  | CNT13 (phr) | 0 | 0 | 0 | 0 | 0 |
|  | CB | HAF (phr) | 0 | 0 | 0 | 0 | 0 |
| Average bending index of filler |  |  | 6.8 | 6.8 | 13 | — | 6.8 |
| Filler content (wt %) |  |  | 11.3 | 6.3 | 0 | 0 | 4.4 |
| Properties of carbon fiber composite resin material | Tensile strength (MPa) |  | 35 | 32 | 30 | 15 | 21 |
|  | Elongation at break (%) |  | 5 | 4 | 2 | 8 | 6 |
|  | Modulus of elasticity E' (30° C.) (GPa) |  | 28 | 24 | 18 | 3.8 | 17 |

|  |  |  | Comparative Example 6 | Comparative Example 7 | Comparative Example 8 | Comparative Example 9 | Comparative Example 10 |
|---|---|---|---|---|---|---|---|
| Epoxy resin | Base resin | Epikote 828 (phr) | 100 | 100 | 100 | 100 | 100 |
|  |  | Epikote 807 (phr) | 0 | 0 | 0 | 0 | 0 |
|  | Curing agent | Amicure VDH (phr) | 40 | 40 | 40 | 40 | 40 |
| Epoxydized elastomer |  | E-SBS (phr) | 50 | 100 | 50 | 50 | 50 |
|  |  | E-NR (phr) | 0 | 0 | 0 | 0 | 0 |
|  |  | SBS (phr) | 0 | 0 | 0 | 50 | 0 |
| T2n of elastomer (30° C.) (microsecond) |  |  | 860 | 860 | 860 | 980 | 860 |
| Elastomer content (wt %) |  |  | 26.3 | 41.7 | 26.3 | 26.3 | 26.3 |
| Filler | CNT | Vapor-grown carbon fiber B (phr) | 200 | 50 | 0 | 50 | 0 |
|  |  | CNT13 (phr) | 0 | 0 | 0 | 0 | 50 |
|  | CB | HAF (phr) | 0 | 0 | 50 | 0 | 0 |
| Average bending index of filler |  |  | 6.8 | 6.8 | — | 6.8 | 2.2 |
| Filler content (wt %) |  |  | 48 | 15.1 | 18.8 | 18.8 | 18.8 |
| Properties of carbon fiber composite resin material | Tensile strength (MPa) |  | — | 28 | 13 | 22 | 33 |
|  | Elongation at break (%) |  | — | 4 | 6 | 1 | 3 |
|  | Modulus of elasticity E' (30° C.) (GPa) |  | — | 20 | 19 | 16 | 21 |

As a result of electron microscope observation, it was found that the vapor-grown carbon fibers A and B had a relatively long distance between the adjacent bent portions (defects) (length Lx of linear portion), and the CNT13 had a short distance between the adjacent bent portions (defects) (length Lx of linear portion). As shown in FIG. 8, it was found that the vapor-grown carbon fibers A and B had a long linear portion and were bent to a small extent in comparison with the CNT13. As shown in Tables 1 and 2, the CNT13 had an average bending index of less than 5. This indicates that the CNT13 had a large number of bent portions in comparison with the vapor-grown carbon fibers A and B.

As shown in Tables 1 and 2, the dynamic modulus of elasticity obtained in Examples 1 to 7 using the vapor-grown carbon fibers A and B having such a high bending index was higher than those of Comparative Examples 8 and 10 using other fillers. A dynamic modulus of elasticity of 30 GPa or more was obtained even in Example 4 in which the content of the vapor-grown carbon fibers was 16.3 wt %. It was found that the dynamic modulus of elasticity exceeds 40 GPa when the content of the vapor-grown carbon fibers exceeds 18 wt %, as demonstrated by Examples 2 and 5 to 7. Since the carbon fiber composite resin material included the epoxidized elastomer, the carbon fiber composite resin material exhibited an elongation at break of 4% or more (i.e. the carbon fiber composite resin material exhibited flexibility). In Comparative Example 6 in which the content of the vapor-grown carbon fibers exceeded 45 wt %, it was impossible to process the mixture in the second mixing step. In Comparative Examples 2 and 5 in which the content of the vapor-grown carbon fibers was less than 10 wt %, a dynamic modulus of elasticity exceeding 30 GPa was not obtained.

As shown in Table 2, the vapor-grown carbon fibers were insufficiently dispersed in Comparative Examples 1 and 2 in which the epoxidized elastomer content in the polymer component was less than 10 wt %. In Comparative Example 7 in which the epoxidized elastomer content in the polymer component exceeded 40 wt %, the modulus of elasticity and rigidity were decreased even though the vapor-grown carbon fibers were added in the same amount as in Example 1. In Comparative Example 9 using the unepoxidized SBS as the elastomer, the dispersibility of the vapor-grown carbon fibers was poor in comparison with Example 2, whereby a dynamic modulus of elasticity of less than 30 GPa and an elongation at break of less than 4% were obtained.

The above results confirmed that the carbon fiber composite resin material according to the invention exhibited high rigidity.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A method of producing a carbon fiber composite resin material comprising:
   (a) a first mixing step of mixing an epoxy resin with an epoxidized elastomer to obtain a first mixture;
   (b) a second mixing step of mixing using an open-roll method with a roll distance of 0.1 mm to 0.5 mm at 0 to 50° C. vapor-grown carbon fibers having an average diameter of 20 to 200 nm and an average length of 5 to 20 micrometers with the first mixture to obtain a second mixture in which the vapor-grown carbon fibers are dispersed;
   (c) a step of curing the second mixture; and
   (d) adding a curing agent for the epoxy resin before step (c), wherein the vapor-grown carbon fibers are rigid fibers having an average value of bending indices defined by the following expression (1) of 5 to 15, $$\text{Bending index} = Lx \div D \tag{1}$$

Lx: length of linear portion of the vapor-grown carbon fiber, and

D: diameter of the vapor-grown carbon fiber, and wherein the epoxidized elastomer is present in the carbon fiber composite resin material in an amount of more than 10 and less than 40 wt %.

2. The method of producing a carbon fiber composite resin material as defined in claim 1, wherein the epoxidized elastomer is present in the carbon fiber composite resin material in an amount of from 12.5 to 36.4 wt %.

* * * * *